US011364863B2

(12) United States Patent
Hammer et al.

(10) Patent No.: US 11,364,863 B2
(45) Date of Patent: Jun. 21, 2022

(54) STRUCTURAL REINFORCEMENT INSERT FOR A VEHICLE BUMPER

(71) Applicant: TOYOTA MOTOR ENGINEERING & MANUFACTURING NORTH AMERICA, INC., Plano, TX (US)

(72) Inventors: Jeremiah T. Hammer, Ann Arbor, MI (US); Brian L. Tew, Ann Arbor, MI (US); John P. Kim, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 98 days.

(21) Appl. No.: 16/864,301

(22) Filed: May 1, 2020

(65) Prior Publication Data

US 2021/0339694 A1 Nov. 4, 2021

(51) Int. Cl.
*B60R 19/18* (2006.01)
*B60R 19/02* (2006.01)
*B62D 65/16* (2006.01)

(52) U.S. Cl.
CPC ............ *B60R 19/18* (2013.01); *B60R 19/023* (2013.01); *B62D 65/16* (2013.01); *B60R 2019/1813* (2013.01)

(58) Field of Classification Search
CPC .................. B60R 19/18; B60R 19/023; B60R 2019/1813; B62D 65/16
See application file for complete search history.

(56) References Cited

U.S. PATENT DOCUMENTS

| 5,219,197 | A | 6/1993 | Rich et al. |
| 5,425,561 | A | 6/1995 | Morgan |
| 5,876,078 | A | 3/1999 | Miskech et al. |
| 6,179,353 | B1 | 1/2001 | Heatherington et al. |
| 6,733,054 | B2 | 5/2004 | Kim |

FOREIGN PATENT DOCUMENTS

| EP | 0854066 A1 | * 7/1998 | ............ B60R 19/18 |
| EP | 3741628 A1 | * 11/2020 | ............ B23P 19/02 |
| FR | 3013285 B1 | 7/2017 | |
| KR | 1020170044160 A | 4/2017 | |
| WO | WO2009121509 A1 | 10/2009 | |

* cited by examiner

*Primary Examiner* — D Glenn Dayoan
*Assistant Examiner* — Melissa Ann Bonifazi
(74) *Attorney, Agent, or Firm* — Haynes and Boone, LLP

(57) ABSTRACT

Disclosed is a device for distributing crash energy within a vehicle. The device includes a member insertable into an end of a bumper beam of a vehicle, where a first portion of the inserted member occupies an unsupported end of the bumper beam. A second portion of the inserted member is fixedly attached to the bumper beam and to a left frame rail or a right frame rail of the vehicle, and a third portion of the inserted member occupies a portion of the bumper beam between the left frame rail and the right frame rail.

30 Claims, 16 Drawing Sheets

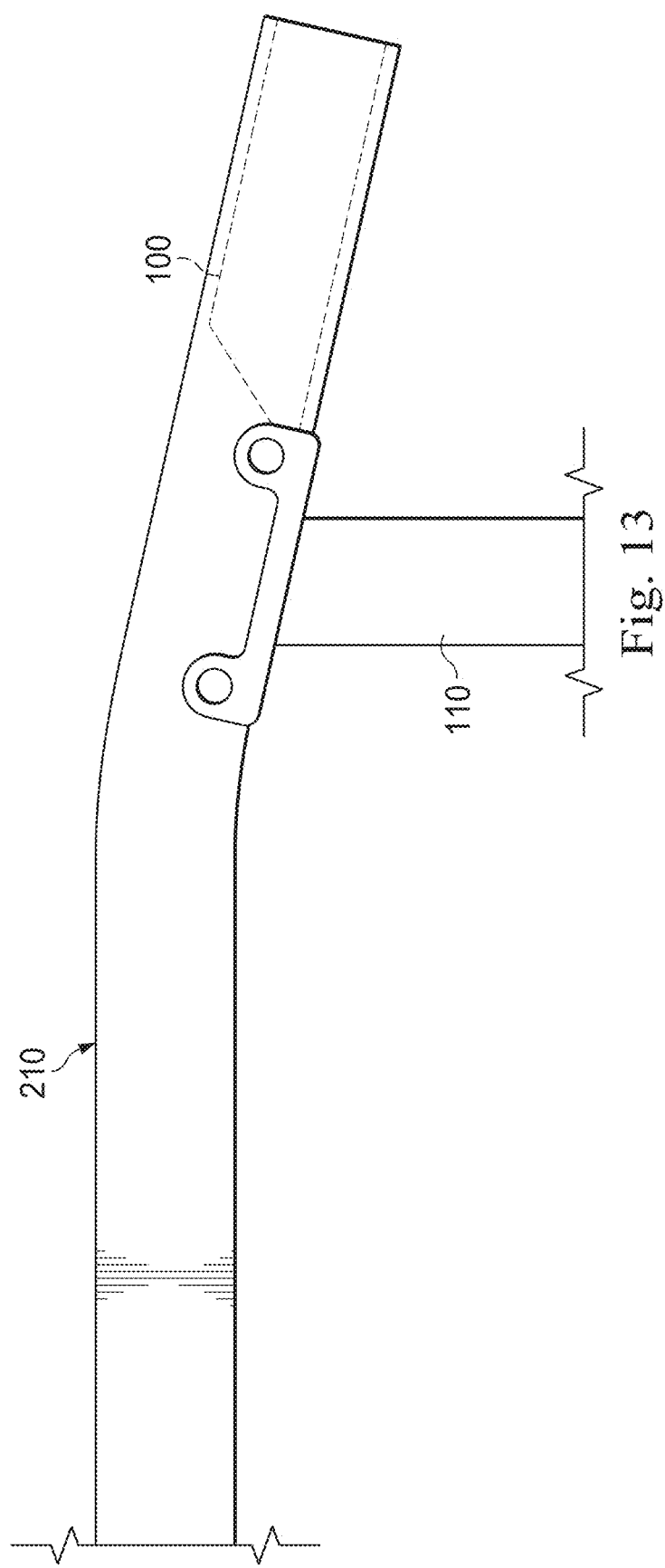

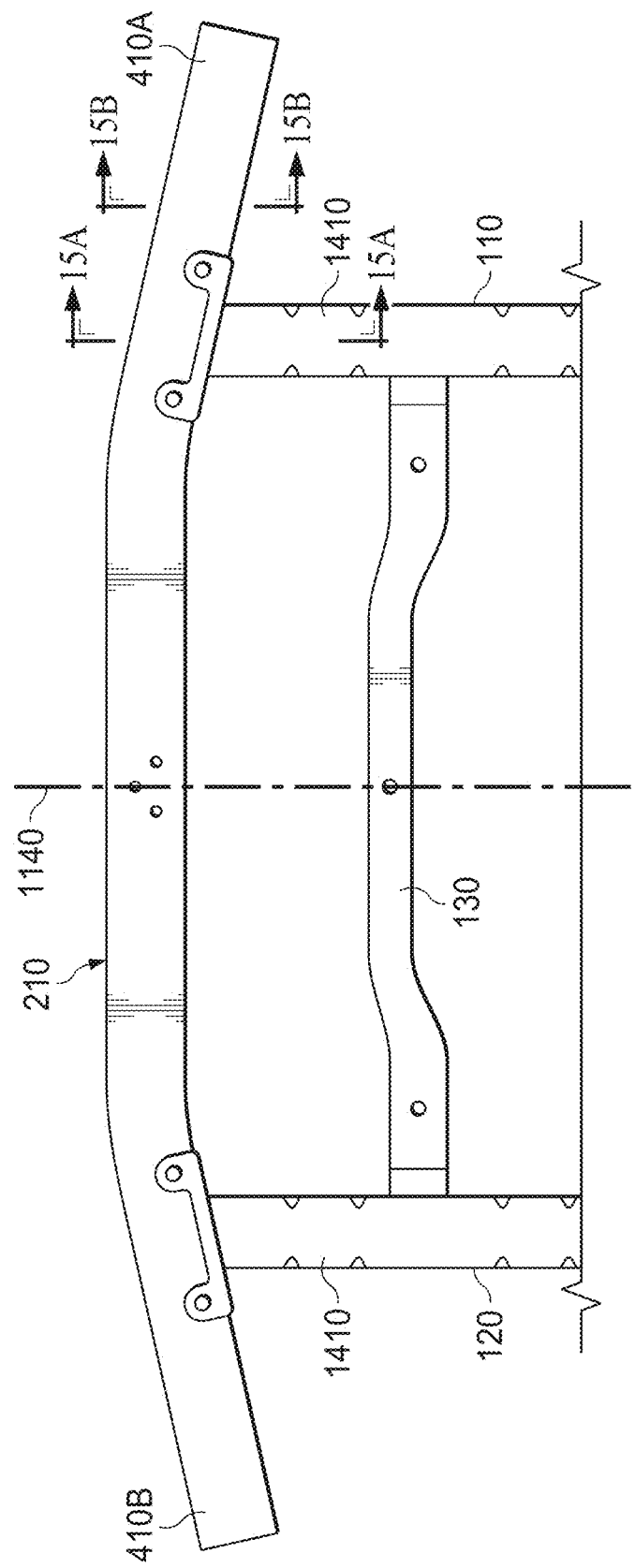

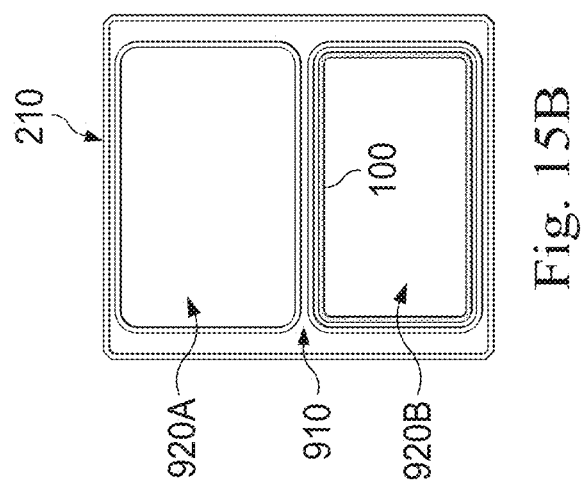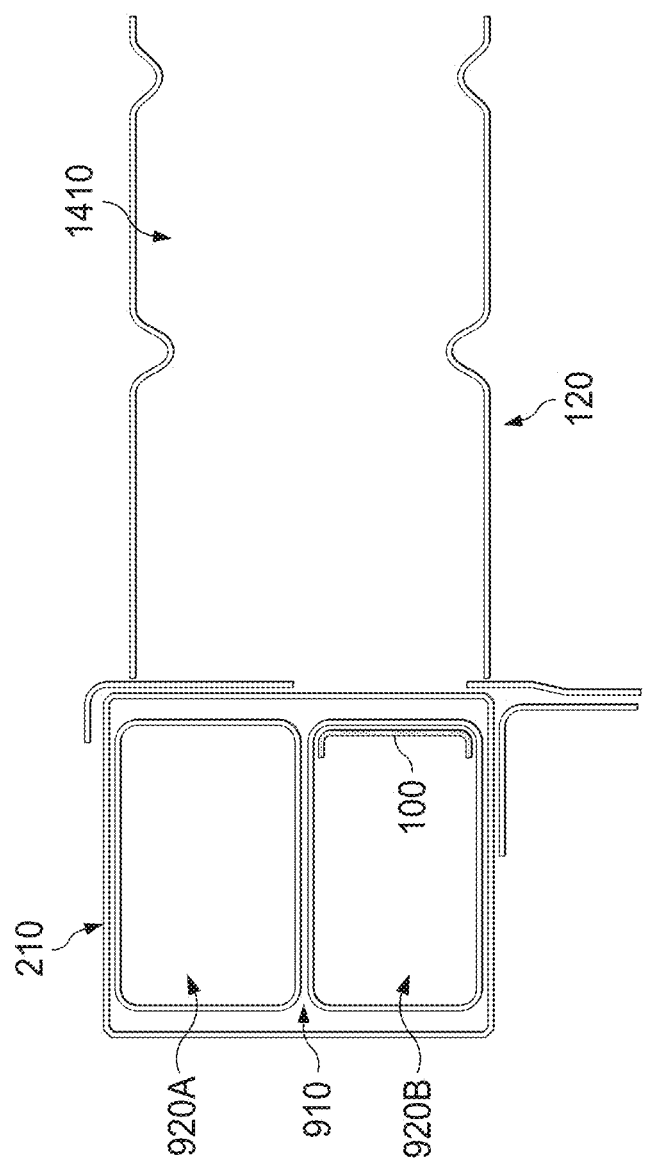

STRUCTURAL REINFORCEMENT INSERT FOR A VEHICLE BUMPER

TECHNICAL FIELD

The subject matter described herein relates to a device, system, and method for improving motor vehicle safety during small overlap rigid barrier (SOL) frontal crashes. This device, system, and method have particular but not exclusive utility for automobiles and trucks.

BACKGROUND

Modern vehicles are designed with crash safety in mind. Crash safety is tested both physically (using actual crashes staged under laboratory conditions) and virtually (using computer models and numerical analysis) to determine the forces, accelerations, and deformations that a given vehicle design will experience in a given set of crash conditions. One particularly challenging scenario occurs during the frontal crash mode called small overlap rigid barrier (SOL), wherein a vehicle strikes a rigid barrier at ~25% overlap or less to the vehicle width. Due to this small overlap between the barrier and the vehicle, the main structural members of the vehicle frame are not directly contacted, and the deformation to the vehicle cabin can be severe. To avoid large deformations to the occupant area, it is advantageous to both engage these missed structural members and to push the vehicle away from the barrier. Engaging the structural members is beneficial, as it permits the structural members to absorb some of the energy of the crash outside of the occupant area (e.g., by bending or crumpling). Pushing the vehicle off the barrier is beneficial because some of the energy is transferred to lateral kinetic energy which will not need to be absorbed by the vehicle. This motion is also beneficial because the vehicle can escape the barrier sooner, which may reduce direct contact between the vehicle cabin and the barrier.

However, the left or right end of a vehicle's front bumper can be torn off in an SOL collision, resulting in less transfer of energy to the vehicle frame and thus more deformation of the vehicle cabin, potentially increasing the risk of injury to vehicle occupants. Many current vehicle frame designs use an aluminum bumper beam to span the front ends of the high strength frame rails. Such a configuration experiences high shear to the bumper beam when contacting the SOL barrier. This shearing action causes the unsupported end of the bumper beam to easily deform and to eventually tear away. SOL crashes may represent approximately 5% of overall crashes, but because they cause disproportionate vehicle damage and disproportionate risk of injury as compared to other crash types, they are of significant concern in vehicle design and testing. Thus, currently used front bumper assemblies have numerous drawbacks, including excessive cabin deformation during SOL crash events, and otherwise. Accordingly, a need exists for improved front bumper assemblies that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a bumper end insert structure that provides one or more additional novel structural members that reduce shearing of the bumper and increase energy absorption through frame crushing during a small overlap rigid barrier (SOL) collision event. The design disclosed herein includes a reinforcement to the bumper structure which improves the strength of the bumper and may reduce fracture of the aluminum bumper beam. Since there are multiple requirements on the bumper beam, this design also includes features to limit the occurrence of side effects to other performance parameters. The disclosed bumper end insert adds steel members into the hollow bumper beam at the end caps, which can improve the force transfer from barrier to frame while limiting tearing of the aluminum bumper beam. This enhancement permits the bumper beam to more fully engage the crushable structural members of the vehicle frame.

The bumper end insert structure disclosed herein has particular, but not exclusive, utility for collision mitigation in automobiles and trucks. One general aspect of the bumper end insert includes a member insertable into an end of a bumper beam of a vehicle, where a first portion of the inserted member occupies an unsupported end of the bumper beam, where a second portion of the inserted member is fixedly attached to the bumper beam and to a left frame rail or a right frame rail of the vehicle, and where a third portion of the inserted member occupies a portion of the bumper beam between the left frame rail and the right frame rail.

Implementations may include one or more of the following features. The device where the first portion, second portion, and third portion each have a u-shaped cross section. The device where second portion has a greater length along a longitudinal axis of the vehicle than the first portion and third portion. The device where the first portion, second portion, and third portion are configured to prevent the unsupported end of the bumper beam from shearing off when deformed by a collision. The device where the first portion has a rectangular cross section, and where the second portion and third portion each have a u-shaped cross section. The device where the first portion extends across an interior width of the bumper beam along a longitudinal axis of the vehicle, and where the second portion and third portion extend for less than the interior width of the bumper beam along the longitudinal axis of the vehicle. The device where the second portion is configured to bend when the unsupported end of the bumper beam is deformed by a collision. The device where the second and third portions are configured to permit the bumper beam to crush along the longitudinal axis of the vehicle, when the bumper beam is deformed by a collision. The device where the member includes steel. The device including the bumper beam. The device including the vehicle.

One general aspect includes a method that includes inserting a member into an end of a bumper beam of a vehicle, where a first portion of the inserted member occupies an unsupported end of the bumper beam, where a second portion of the inserted member is fixedly attached to the bumper beam and to a left frame rail or right frame rail of the vehicle, and where a third portion of the inserted member occupies a portion of the bumper beam between the left frame rail and right frame rail.

Implementations may include one or more of the following features. The method where the first portion, second portion, and third portion each have a u-shaped cross section, and where the second has a greater length along a longitudinal axis of the vehicle than the first portion and third portion. The method where the first portion, second portion, and third portion are configured to prevent the unsupported end of the bumper beam from shearing off when deformed by a collision. The method where the first portion has a rectangular cross section extending across an interior width of the bumper beam along a longitudinal axis of the vehicle, and where the second portion and third portion each have a u-shaped cross section extending for less than the interior width of the bumper beam along the longitudinal axis of the vehicle. The method where the second portion is configured to bend when the unsupported end of the bumper beam is deformed by a collision, and where the second and third portions are configured to permit the bumper beam to crush along the longitudinal axis of the vehicle, when the bumper beam is deformed by the collision. The method where the member includes steel.

One general aspect includes a system for distributing crash energy within a vehicle. The system includes the vehicle; a left frame rail positioned on a left side of the vehicle; a right frame rail positioned on a right side of the vehicle; a bumper beam extending laterally between the left frame rail and the right frame rail, and having a left unsupported end extending beyond the left frame rail and a right unsupported end extending beyond the right frame rail; a first steel member having: a first section positioned within the left unsupported end of the bumper beam; a second section positioned within the bumper beam and fixedly attached to the bumper beam and the left frame rail; and a third section positioned within the bumper beam and extending partway between the left frame rail and the right frame rail. The system also includes a second steel member having: a first section positioned within the right unsupported end of the bumper beam, a second section positioned within the bumper beam and fixedly attached to the bumper beam and the right frame rail, and a third section positioned within the bumper beam and extending partway between the right frame rail and the left frame rail.

Implementations may include one or more of the following features. The system where the first portion of each steel member has a rectangular cross section extending across an interior width of the bumper beam along a longitudinal axis of the vehicle, and where the second portion and third portion of each steel member each have a u-shaped cross section extending for less than the interior width of the bumper beam along the longitudinal axis of the vehicle. The system where the second portion of each steel member is configured to bend when the corresponding unsupported end of the bumper beam is deformed by a collision, and where the second and third portions are configured to permit the bumper beam to crush along the longitudinal axis of the vehicle, when the bumper beam is deformed by the collision.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the bumper end insert structure, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 13 is a top view of an example bumper end insert structure in accordance with at least one embodiment of the present disclosure.

FIG. 14 is a top view of an example bumper beam in accordance with at least one embodiment of the present disclosure.

FIG. 15A is a side cross-sectional view along a plane defined by line 15B-15B of FIG. 14, of an example bumper end insert structure in accordance with at least one embodiment of the present disclosure.

FIG. 15B is a side cross-sectional view along a plane defined by line 15A-15A of FIG. 14, of an example bumper end insert structure in accordance with at least one embodiment of the present disclosure.

DETAILED DESCRIPTION

Figure 1:
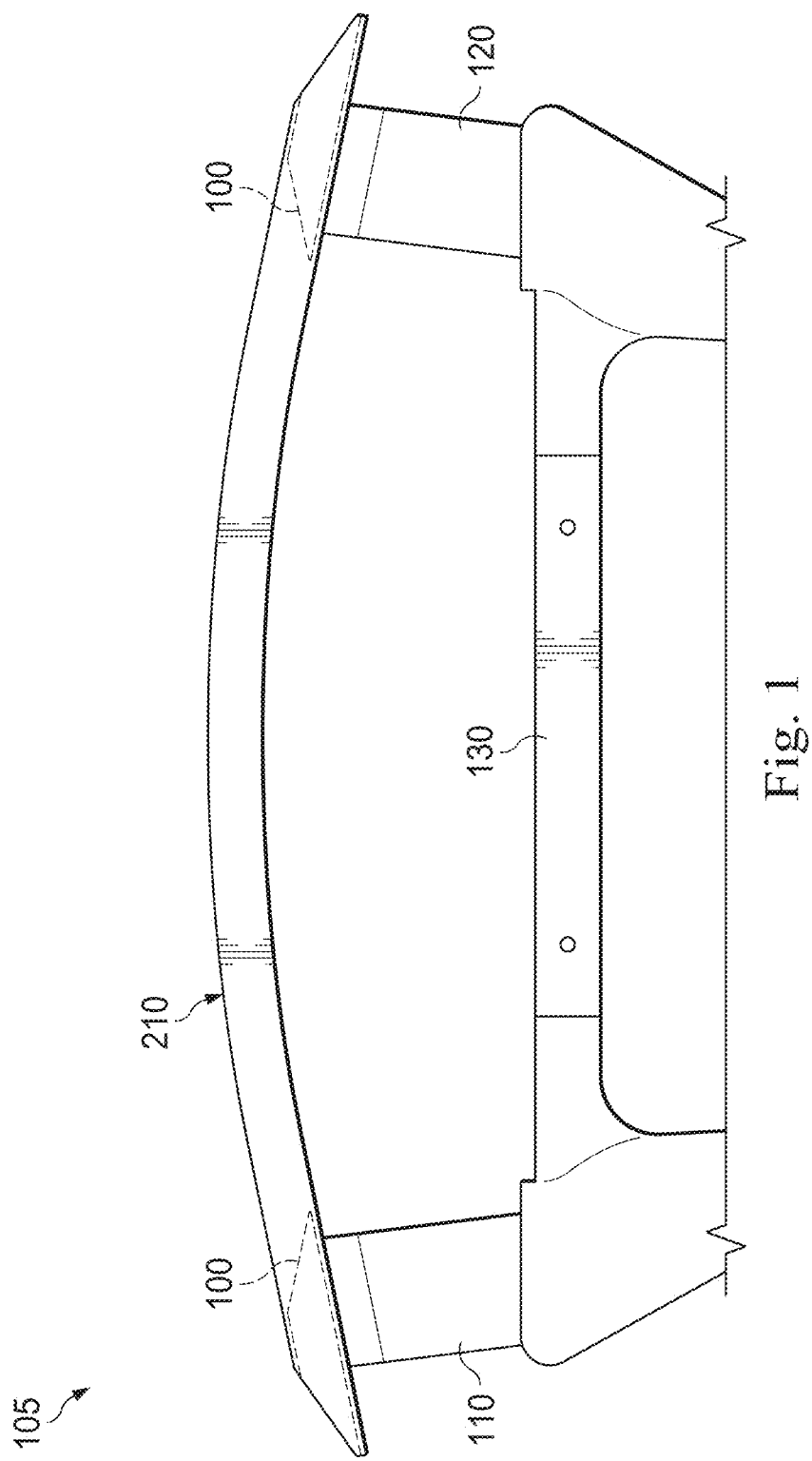
FIG. 1 is a top view of an example bumper end insert structure in accordance with at least one embodiment of the present disclosure.

In accordance with at least one embodiment of the present disclosure, a bumper end insert structure is disclosed that provides one or more additional novel structural members that reduce shearing of the bumper and increase energy absorption (e.g., through frame crushing) during a small overlap rigid barrier (SOL) collision event. The design disclosed herein includes a reinforcement to the bumper structure which improves the strength of the bumper and may reduce the occurrence and/or severity of fracture, shearing, or tearing of the aluminum bumper beam material, thus helping to protect the passenger cabin. Since there are multiple requirements on the bumper beam, the design also includes features to limit the occurrence of unwanted side effects to other vehicle performance parameters (e.g., weight, size, other crash modes, etc.). The disclosed bumper end insert adds one or more steel members into the hollow bumper beam at the end caps, and may improve the force transfer from the SOL barrier to the crumple zones of the vehicle frame, by delaying or preventing the tearing of the aluminum bumper beam. This enhancement permits the bumper beam to more fully engage the crushable structural members of the vehicle frame, both early in the collision event and for a longer period of time during the collision. The reinforcement structures may also reduce or delay bolt tear-out on the unstruck side of the bumper beam, thus keeping it attached (or attached for longer) to the frame rail on the unstruck side of the vehicle.

These descriptions are provided for exemplary purposes only, and should not be considered to limit the scope of the bumper end insert structure. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a top view of an example bumper end insert structure 100 in accordance with at least one embodiment of the present disclosure. The present disclosure adds several improvements to the current technology. The bumper end inserts 100 of the present disclosure fit within the ends of an aluminum bumper beam 210, to facilitate transfer of energy from the bumper beam 210 to the vehicle frame 105, through the left hand frame rail 110 or right hand frame rail 120, during an SOL collision event. Also visible is the No. 1 frame cross member 130.

Before continuing, it should be noted that the examples described above are provided for purposes of illustration, and are not intended to be limiting. Other devices and/or device configurations may be utilized to carry out the operations described herein.

Figure 2:
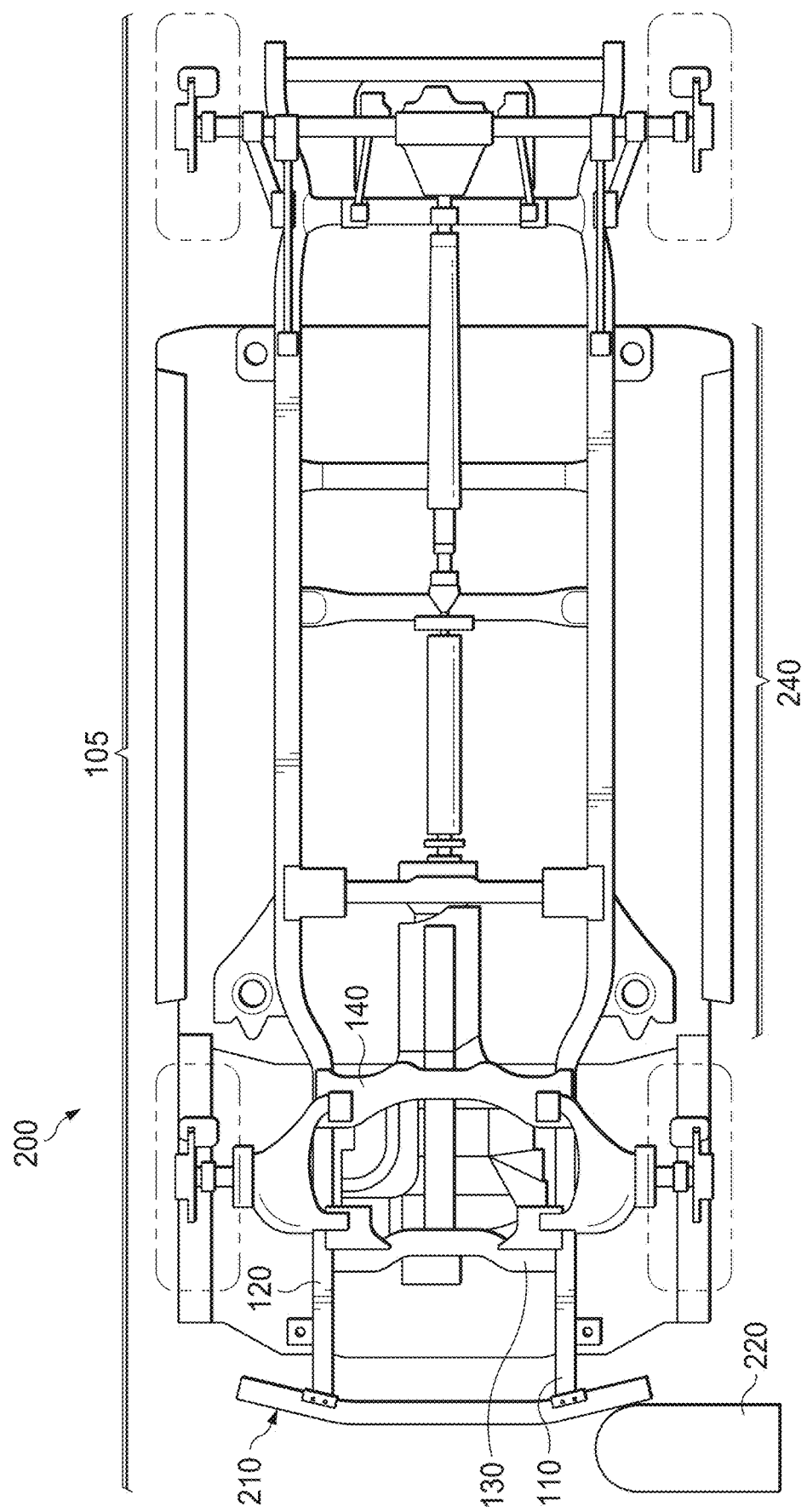
FIG. 2 is a bottom view of an example vehicle frame of a vehicle in accordance with at least one embodiment of the present disclosure.

FIG. 2 is a bottom view of an example vehicle frame 105 of a vehicle 200. Visible are the left-hand frame rail 110, right hand frame rail 120, No. 1 frame cross member 130, and No. 2 frame cross member 140. The vehicle frame also includes a bumper beam 210, and supports a cabin or vehicle occupant area 240. Protecting the vehicle occupant area 240 from excessive deceleration or intrusion during an SOL collision event is a feature of the present disclosure. When the left edge of the bumper 210 is struck by an SOL barrier 220, the end of the bumper 210 is likely to fracture, shear, or tear off, which limits the ability of the vehicle frame 105 to absorb, distribute, and dissipate the crash energy (e.g., through crumpling). If the barrier 220 misses the frame rail 110 entirely, and the bumper end shears off or tears off, then it is the body rather than the frame of the vehicle that must absorb the crash energy, and deformation to the cabin 240 may be particularly severe.

Although the SOL barrier 220 is shown here with a particular size and shape, it should be understood that an SOL barrier may be or include any fixed barrier such as a wall, sign post, telephone pole, light pole, concrete divider, guard rail, bridge abutment, tree, etc., or may in some cases be or include a large movable object such as a vehicle, wild animal, boulder, etc.

Figure 3:
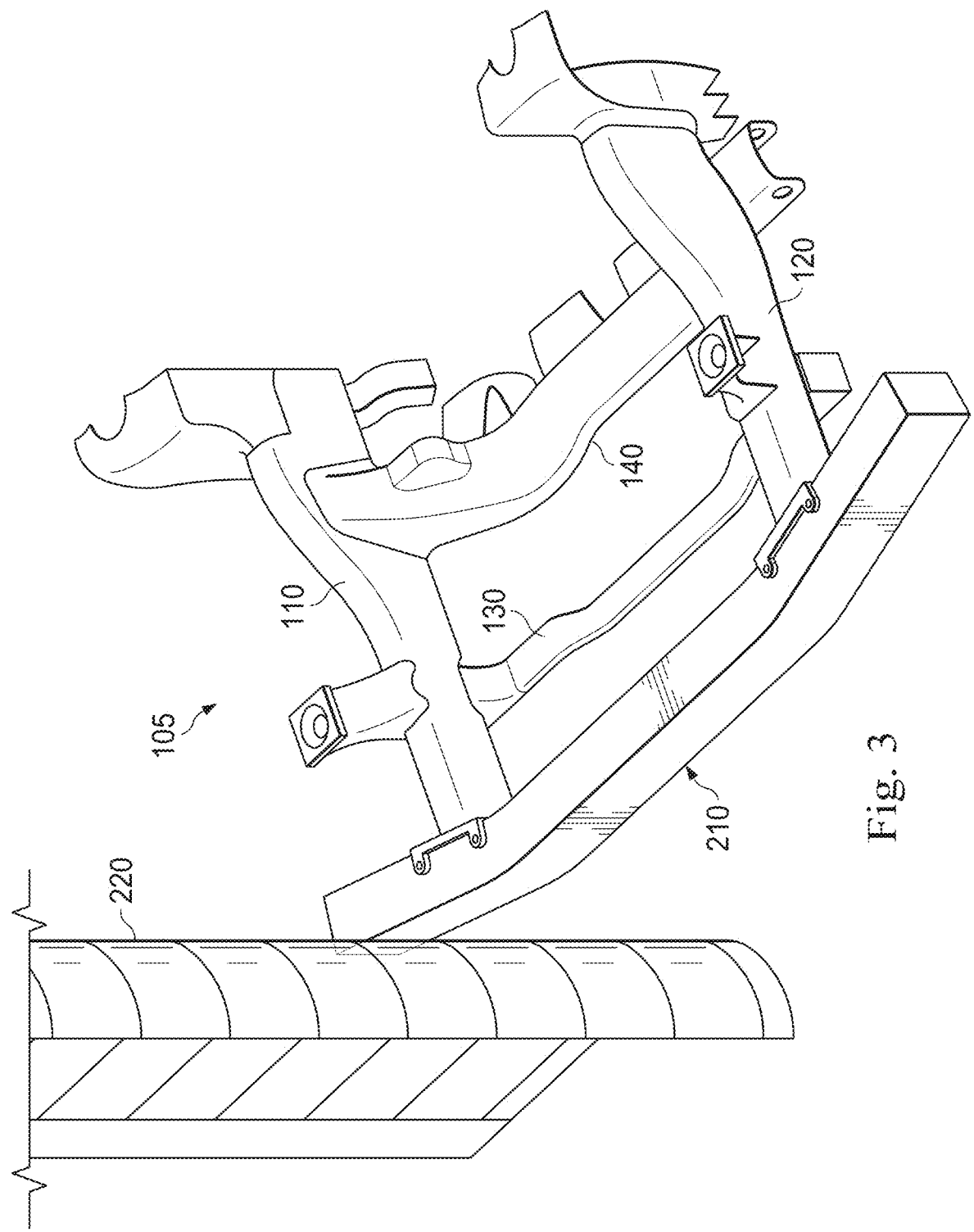
FIG. 3 is a perspective view of an example bumper beam in accordance with at least one embodiment of the present disclosure, being contacted by an SOL barrier.

FIG. 3 is a perspective view of an example bumper beam 210, being contacted by an SOL barrier 220. The frame 105 includes the bumper beam 210, right frame rail 110, left frame rail 120, No. 1 frame cross member 130, and No. 2 frame cross member 140.

Figure 4:
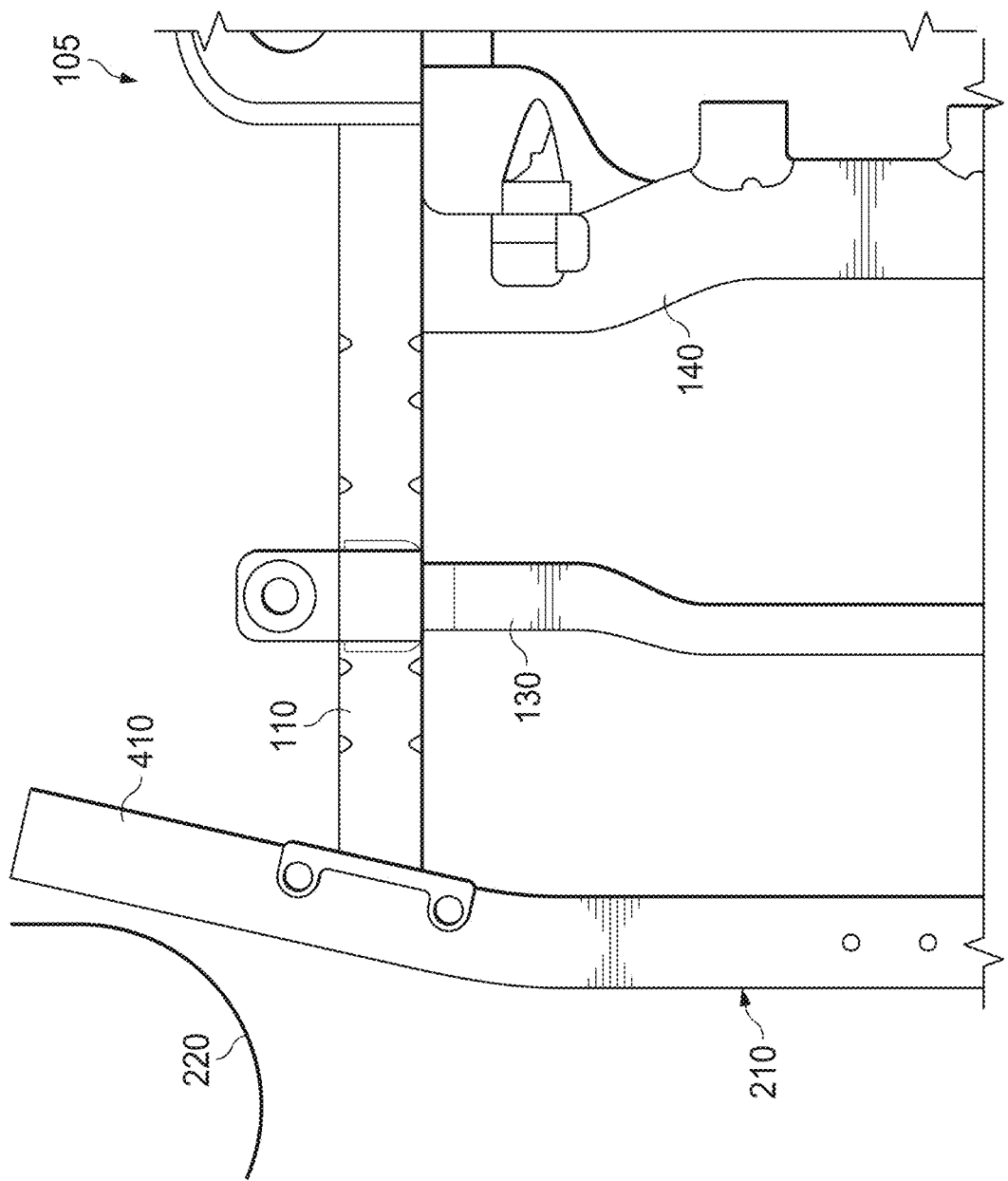
FIG. 4 is a top view of an example bumper beam in accordance with at least one embodiment of the present disclosure, being contacted by an SOL barrier.

FIG. 4 is a top view of an example bumper beam 210, being contacted by an SOL barrier 220. The frame 105 includes the bumper beam 210, right frame rail 110, No. 1 frame cross member 130, and No. 2 frame cross member 140. The bumper beam 210 includes an unsupported end section 410 that projects beyond the right frame rail 110.

Figure 5:
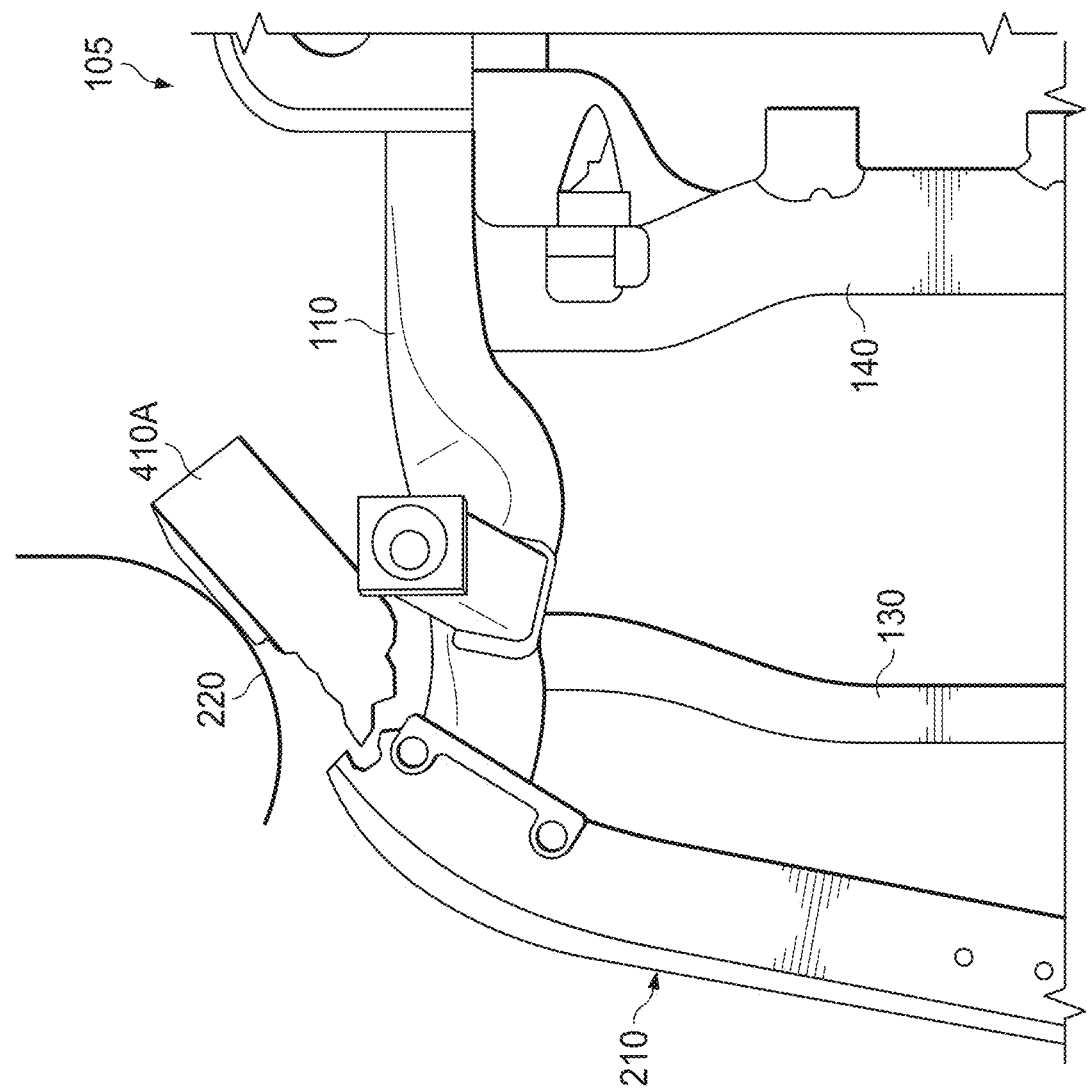
FIG. 5 is a top view of an example bumper beam in accordance with at least one embodiment of the present disclosure, being contacted by an SOL barrier.

FIG. 5 is a top view of an example bumper beam 210, being contacted by an SOL barrier 220. The frame 105 includes the bumper beam 210, right frame rail 110, No. 1 frame cross member 130, and No. 2 frame cross member 140. The bumper beam 210 includes an unsupported end section 410 that projects beyond the right frame rail 110. In this example, the unsupported section 410 has sheared off due to the pushing force of the SOL barrier during an SOL collision event. This limits the amount of collision energy the bumper beam 210 can transfer to the vehicle frame 105, and thereby limits the ability of the vehicle frame 105 to transfer, redirect, absorb, or dissipate the SOL collision energy. As a result, decelerations of and intrusions into the passenger cabin 240 may be excessive (e.g., unsafe for vehicle occupants) even during fairly low-speed SOL collisions.

Figure 6:
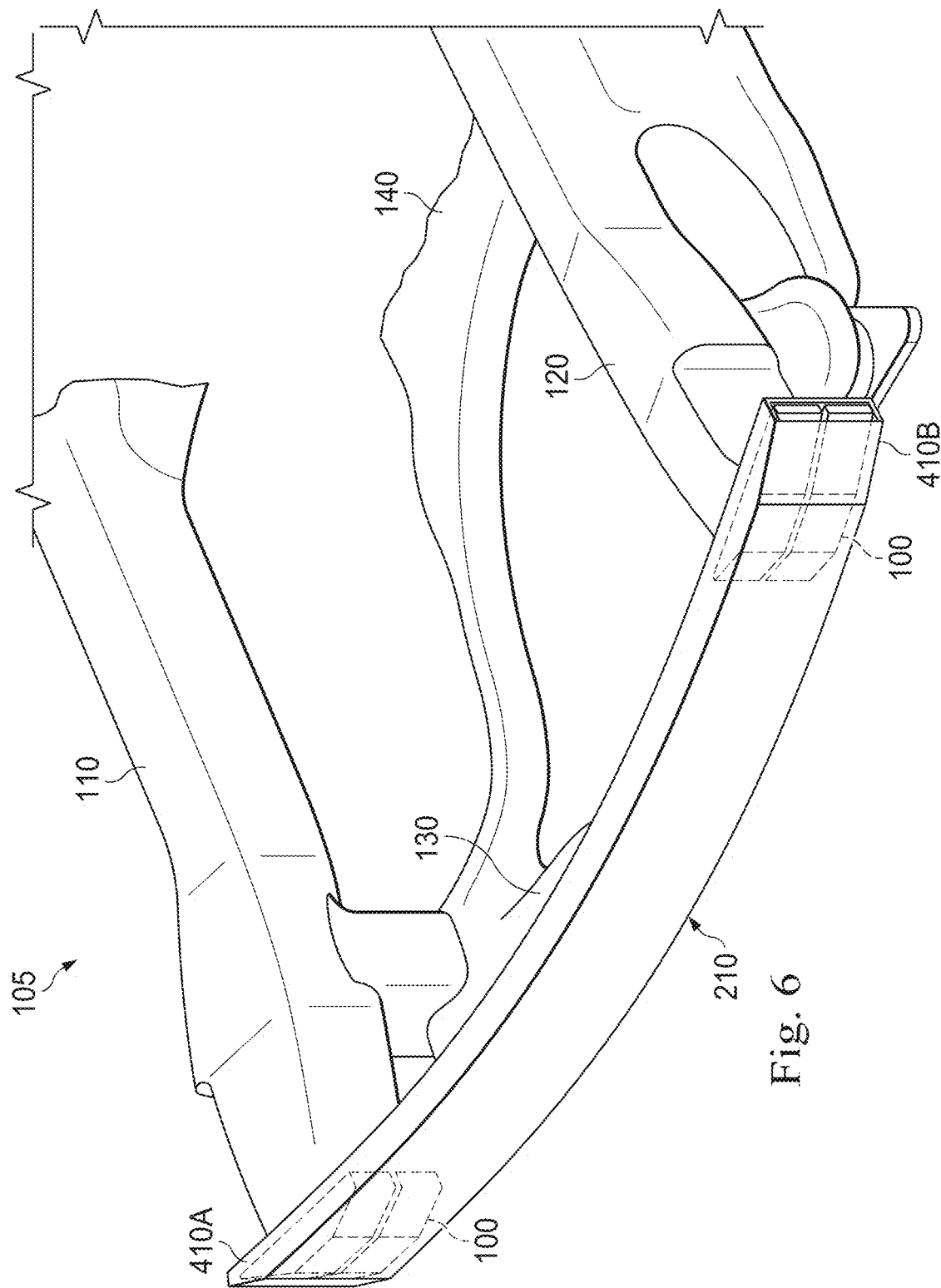
FIG. 6 is a perspective view of an example bumper end insert structure in accordance with at least one embodiment of the present disclosure.

FIG. 6 is a perspective view of an example bumper end insert structure 100 in accordance with at least one embodiment of the present disclosure. The bumper end inserts 100 of the present disclosure fit within the right and left ends 410A and 410B of the aluminum bumper beam 210, and are each fixedly attached (e.g., bolted, welded) to both the bumper beam 210 and their respective frame rails 110 and 120. In an example, the bumper end inserts 100 are made of steel, and provide internal support to the unsupported ends 410A and 410B of the bumper beam 210, making it more difficult for an end 410A or 410B of the beam 210 to shear off during an SOL collision event. Rather, the end 410A or 410B is relatively more likely to bend, while remaining attached to the bumper beam 210. This absorbs a certain amount of crash energy, while also facilitating transfer of energy from the bumper beam 210 to the vehicle frame 105, through the left-hand frame rail 110 or right hand frame rail 120, during an SOL collision event. Also visible are the No. 1 frame cross member 130 and No. 2 frame cross member 140.

As a design tradeoff, the bumper end inserts 100 may be rigid to improve pushing, may be partially crushable to improve energy absorption, or any combination thereof. The bumper end inserts 100 on the left and right sides of the vehicle may be mirror images of one another, or may be identical but flipped (e.g., around the longitudinal axis of the vehicle 200).

Figure 7:
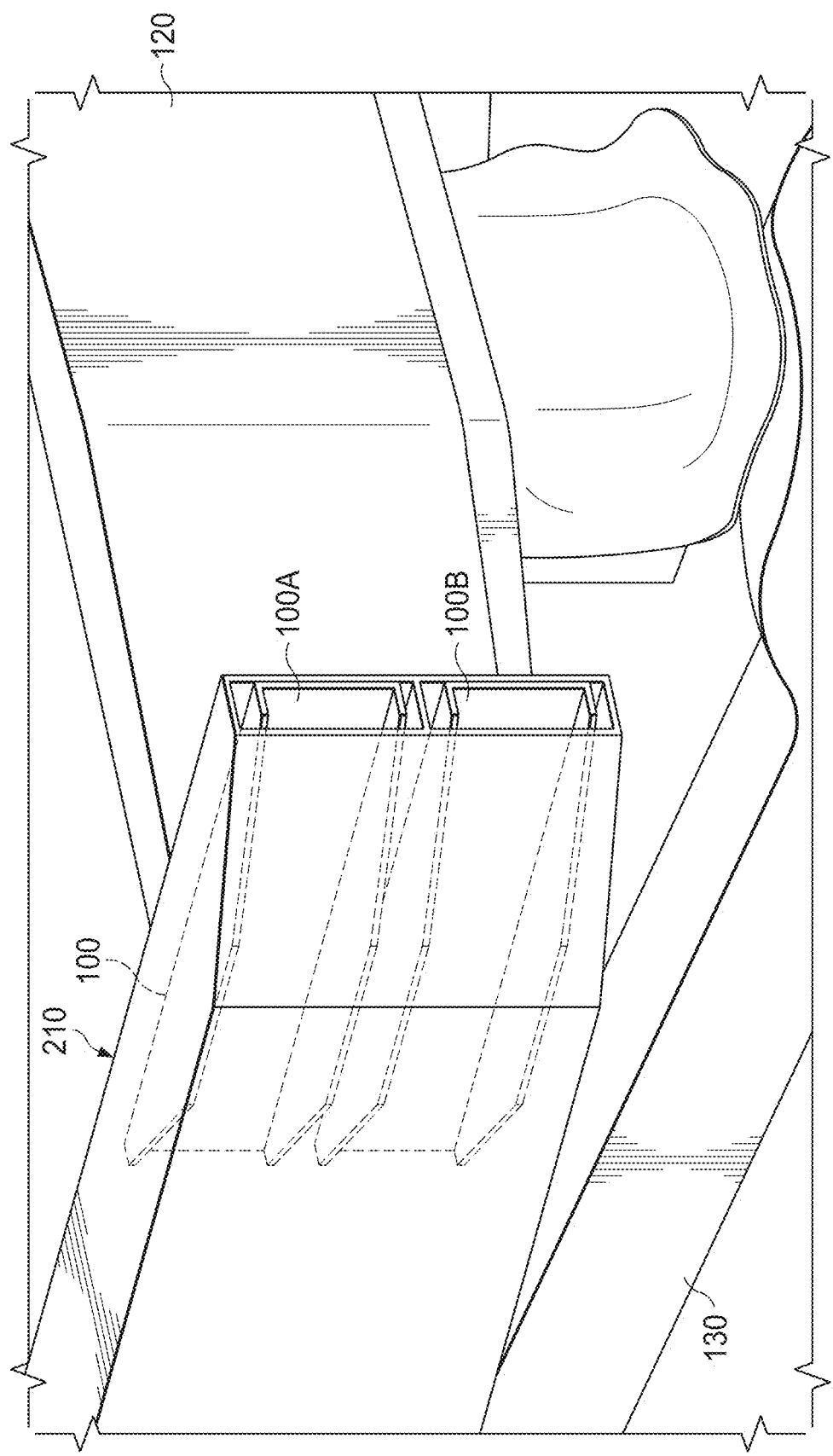
FIG. 7 is a rear view of an example bumper end insert structure in accordance with at least one embodiment of the present disclosure.

FIG. 7 is a rear view of an example bumper end insert structure 100 in accordance with at least one embodiment of the present disclosure. In this example, the bumper end insert 100 comprises an upper member 110A and a lower member 100B, which fit into separate compartments of the bumper beam 210. Also in this example, the upper member 100A and lower member 100B are each fixedly attached (e.g., bolted, welded, etc.) to both the bumper beam 210 and the left-hand frame rail 110. This structure may be advantageous in vehicles where the bumper beam 210 includes multiple compartments. The bumper beam 210 may include one, two, three, or more compartments, each of which may or may not include its own separate bumper end insert member 110A, 110B, 110C, etc. These members may be identical to one another, or may be of different sizes, shapes, or materials to accommodate bumper beam compartments of different sizes or shapes. More detail is provided in FIGS. 8 and 9.

Figure 8:
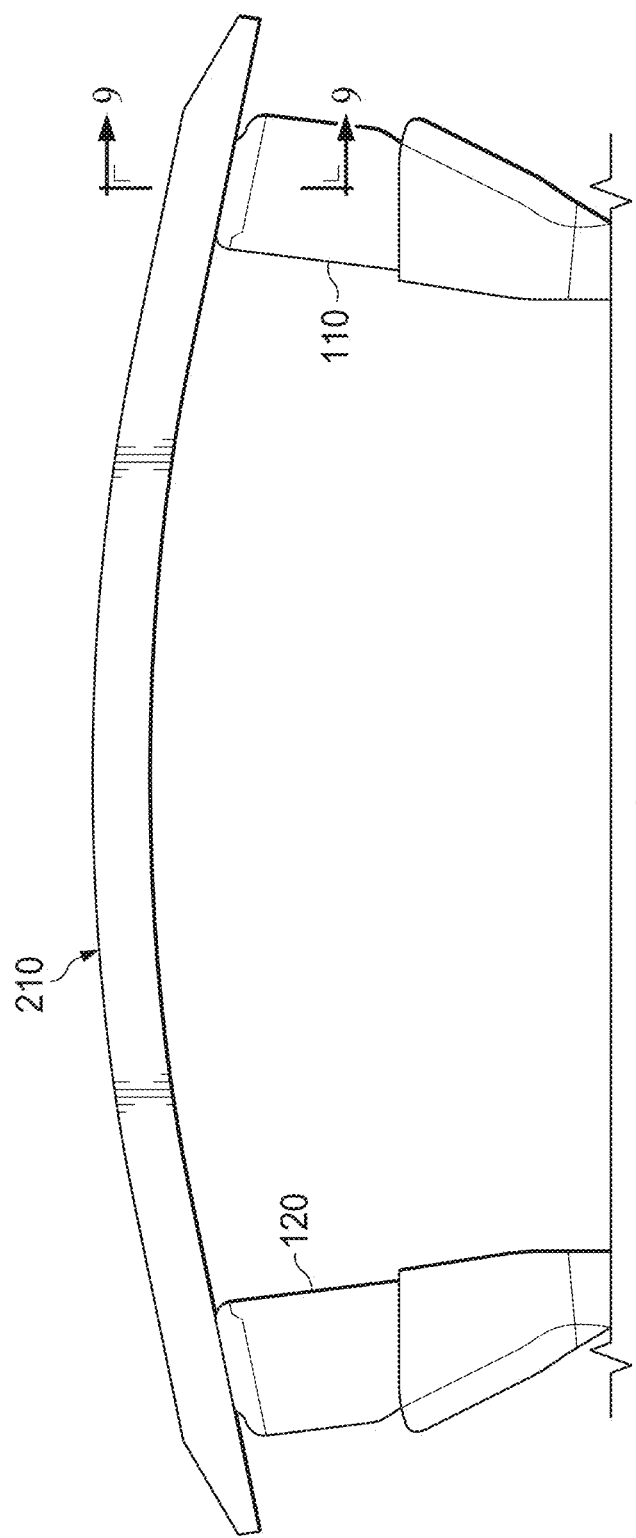
FIG. 8 is a top view of an example bumper beam in accordance with at least one embodiment of the present disclosure.

FIG. 8 is a top view of an example bumper beam 210 in accordance with at least one embodiment of the present disclosure. In this example, the bumper beam 210 is fixedly attached (e.g., bolted, welded, etc.) to the right and left frame rails 110 and 120. Also visible is a section line 9-9 that passes through both a portion of the bumper beam 210 and the right-hand frame rail 110.

Figure 9:
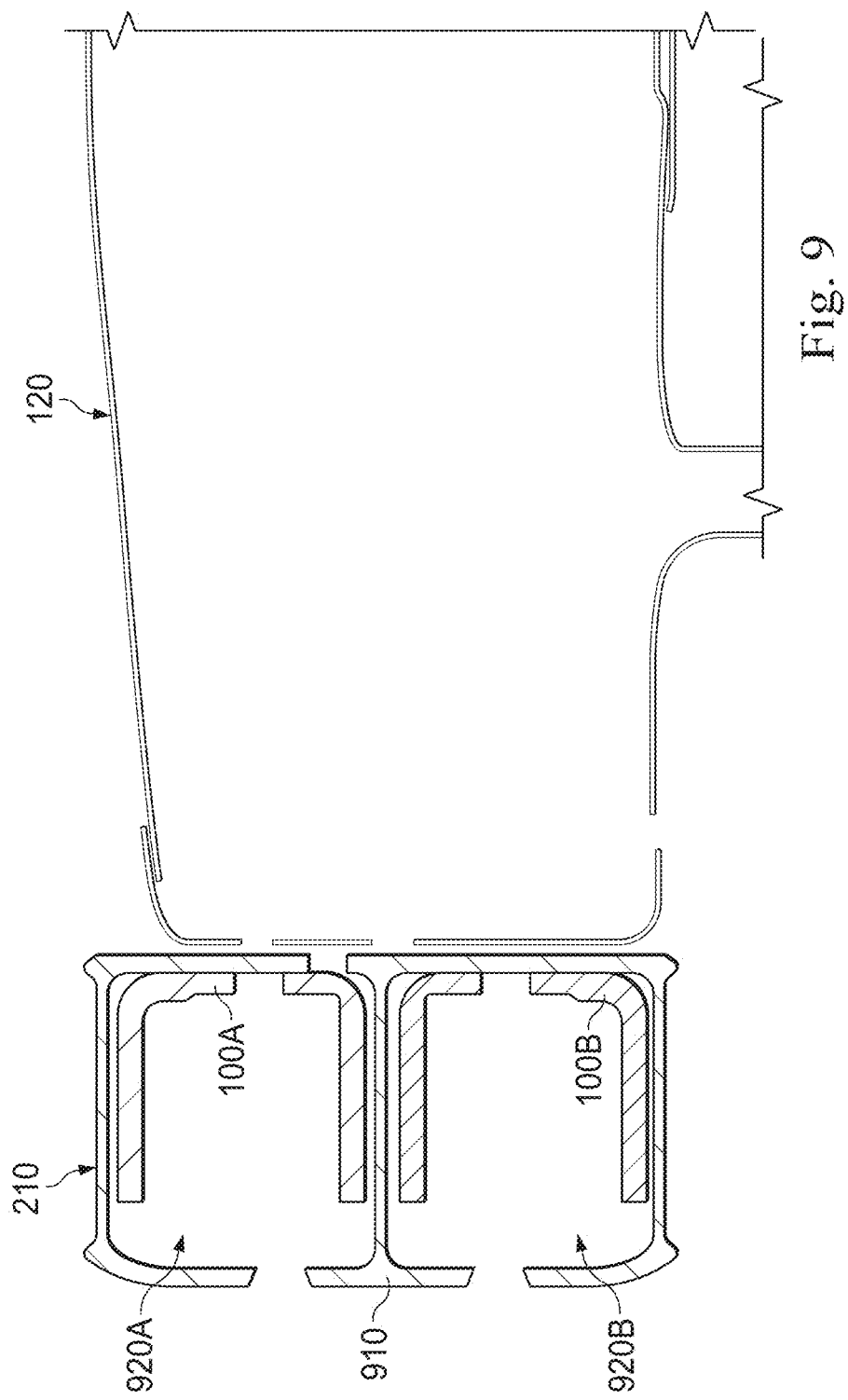
FIG. 9 is a side cross-sectional view along a plane defined by line 9-9 of FIG. 8, of an example bumper end insert structure in accordance with at least one embodiment of the present disclosure.

FIG. 9 is a side cross-sectional view along a plane defined by line 9-9 of FIG. 8, of an example bumper end insert structure 100 in accordance with at least one embodiment of the present disclosure. In this example, the bumper beam 210 comprises a single extrusion that includes a central partition 910 defining two compartments, 920A and 920B. The top member 100A of the bumper end insert 100 fits into compartment 920A as shown, while the bottom member 100B of the bumper end insert 100 fits into compartment 920B. The top member 100A and bottom member 100B are each fixedly attached (e.g., bolted, welded, etc.) to both the bumper beam 210 and the left-hand frame rail 120.

In this example, the top member 100A and bottom member 100B are U-shaped extrusions which may for example be made of steel, although other shapes and materials may be employed instead or in addition. Such a structure provides additional strength to the bumper beam 210 such that its unsupported ends are less likely to shear off or tear off during an SOL collision event.

Figure 10:
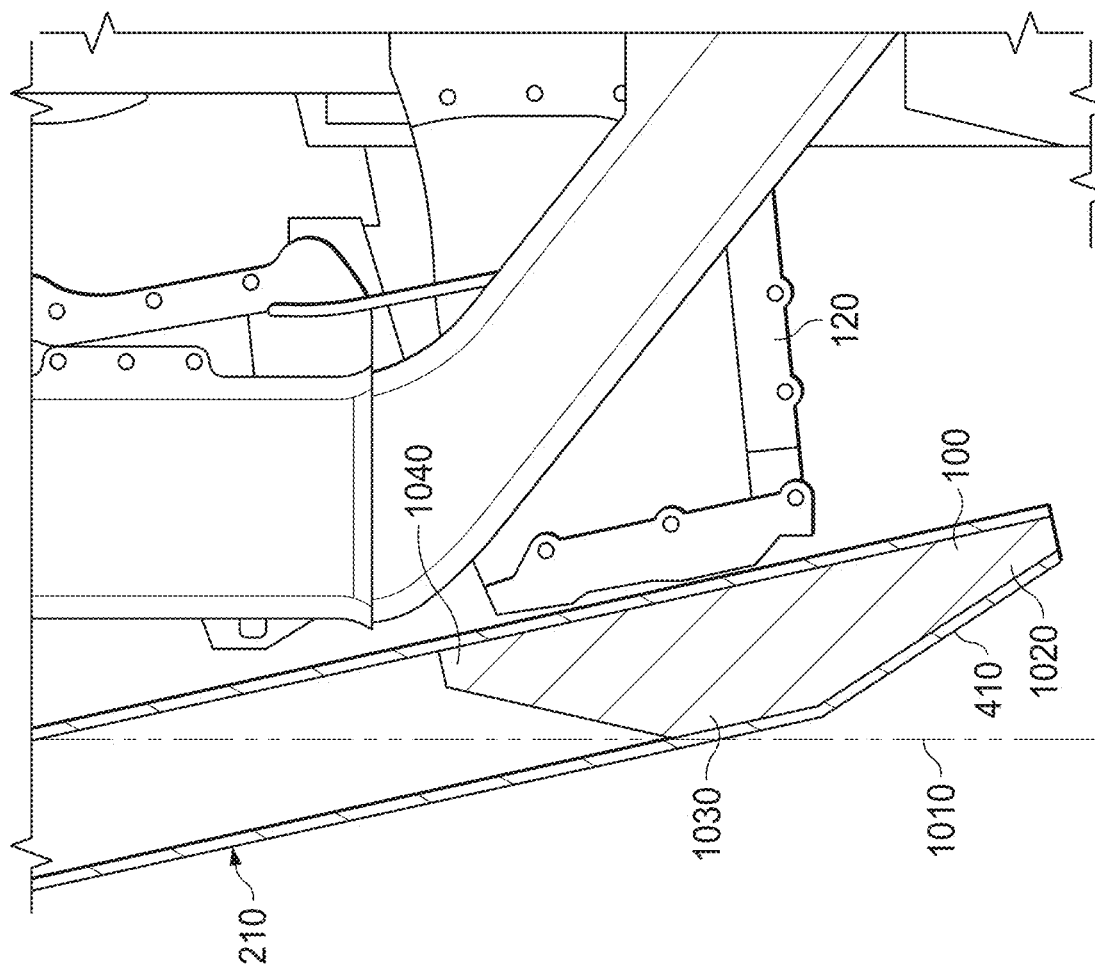
FIG. 10 is a top cross-sectional view of a bumper end insert in accordance with at least one embodiment of the present disclosure.

FIG. 10 is a top cross-sectional view of a bumper end insert 100 in accordance with at least one embodiment of the present disclosure. The bumper end insert 100 extends into the unsupported end 410 of the bumper beam 210, reducing the probability that the unsupported end 410 will shear off during an SOL collision event. The bumper end insert 100 includes a first portion 1020 occupying the unsupported end 410 of the bumper beam 210, a second portion 1030 that is fixedly attached to both the bumper beam 210 and the left frame rail 120, and a third portion that extends into the bumper beam 210 between the left frame rail 120 and right frame rail 130 (not pictured). In the example shown in FIG. 10, the first and third portions are thinner than the second portion, giving the bumper end insert a trapezoidal shape when viewed from above.

However, in this example, a flat, fixed, rigid barrier 1010 (e.g., a wall or oncoming vehicle) is colliding head-on with the bumper beam 210. The configuration shown, with a bumper end insert 100 having a trapezoidal shape when viewed from above, may also tend to prevent the bumper beam 210 from crushing properly, thus limiting the amount of energy the bumper beam 210 can absorb during a head-on collision. Rather, collision energy may be transferred from the SOL barrier 220, through the bumper end insert 100 to the frame rail 120, very early in the crash event, without the usual amount of energy absorption, due to crushing or flattening of the bumper beam 210, that would be expected in a vehicle without the bumper end insert 100. In some embodiments, this problem may be mitigated by changing the cross-sectional shape of the bumper end insert 100, as shown below.

Figure 11:
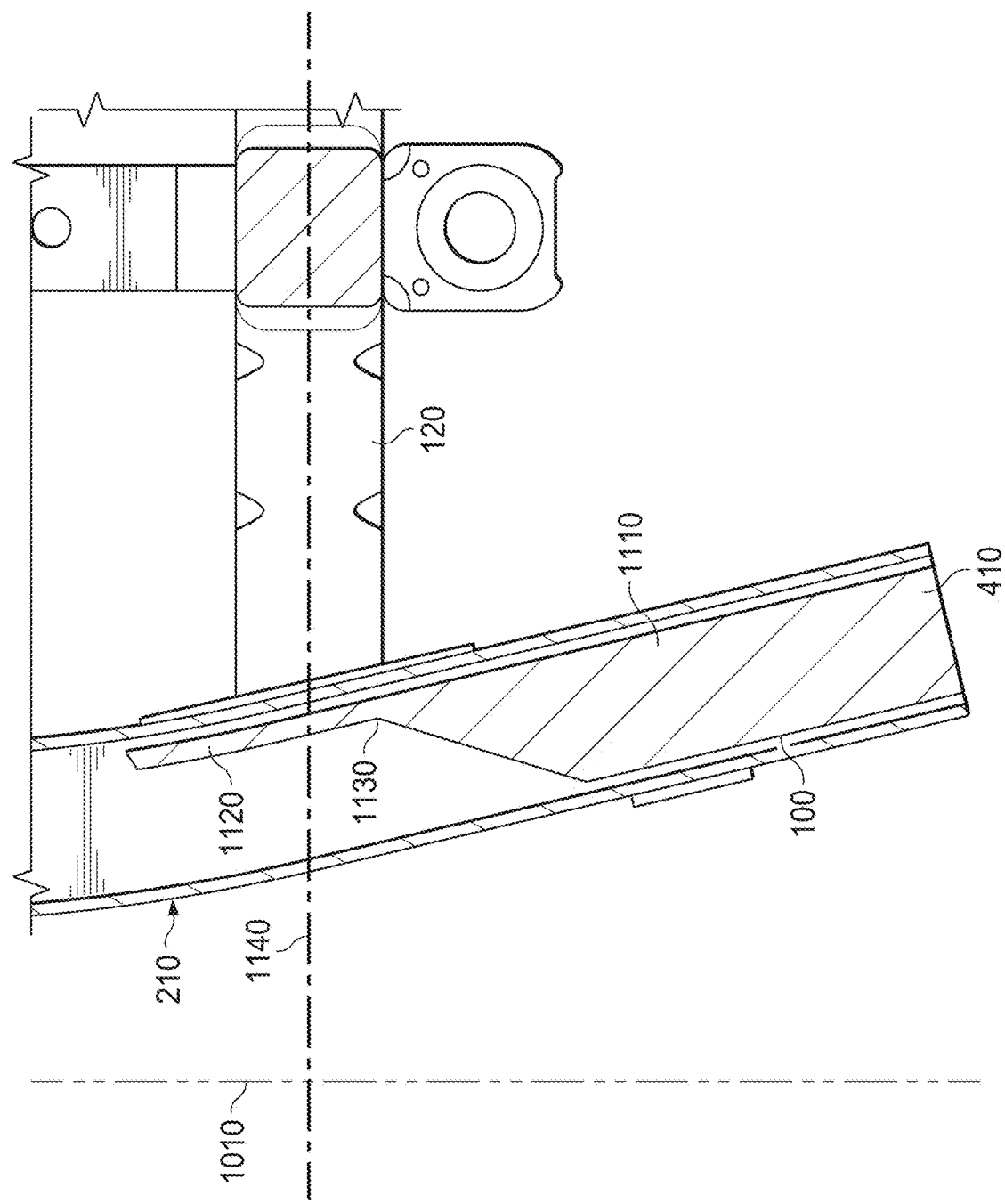
FIG. 11 is a top cross-sectional view of a bumper end insert in accordance with at least one embodiment of the present disclosure.

FIG. 11 is a top cross-sectional view of a bumper end insert 100 in accordance with at least one embodiment of the present disclosure. In this example, the bumper end insert 100 comprises a different cross-sectional shape than shown in the example of FIG. 10, with a first portion or body portion 1110 occupying the unsupported end, a third portion or tab portion 1120 extending through the bumper beam 210 between the left frame rail 120 and right frame rail 110 (not pictured), and a second portion or bending point or connection point 1130 that is fixedly attached to both the bumper beam 210 and the left frame rail 120. This configuration provides SOL collision protection similar to that of the embodiment shown in FIG. 10. During an SOL collision event, the bumper beam 210 and bumper end insert 100 may both tend to bend at the bending point or connection point 1130, while the tab portion 1120 (made for example of steel) remains fixedly attached to both the bumper beam 210 and the left-hand frame rail 120, such that the unsupported end 410 is prevented from easily fracturing, shearing, or tearing off.

However, in a head-on collision, this configuration allows the bumper beam 210 to crush or flatten along the longitudinal axis 1140 of the vehicle 200. This complements the transfer of crash energy from the barrier 1010 to the frame rail 120, thus improving overall energy absorption during the head-on collision event. Once the bumper beam 210 has crushed or flattened in the vicinity of the tab section 1120, crash energy may be transferred from the barrier 1010 to the frame rail 120, which may then crumple or transfer energy to other portions of the frame 105, depending on the implementation. Thus, the embodiment shown in FIG. 11 provides enhanced crash protection during an SOL crash event vs. the related-art configurations shown in FIGS. 2-5, while permitting head-on collision performance that is comparable to the configurations shown in FIGS. 2-5.

Figure 12:
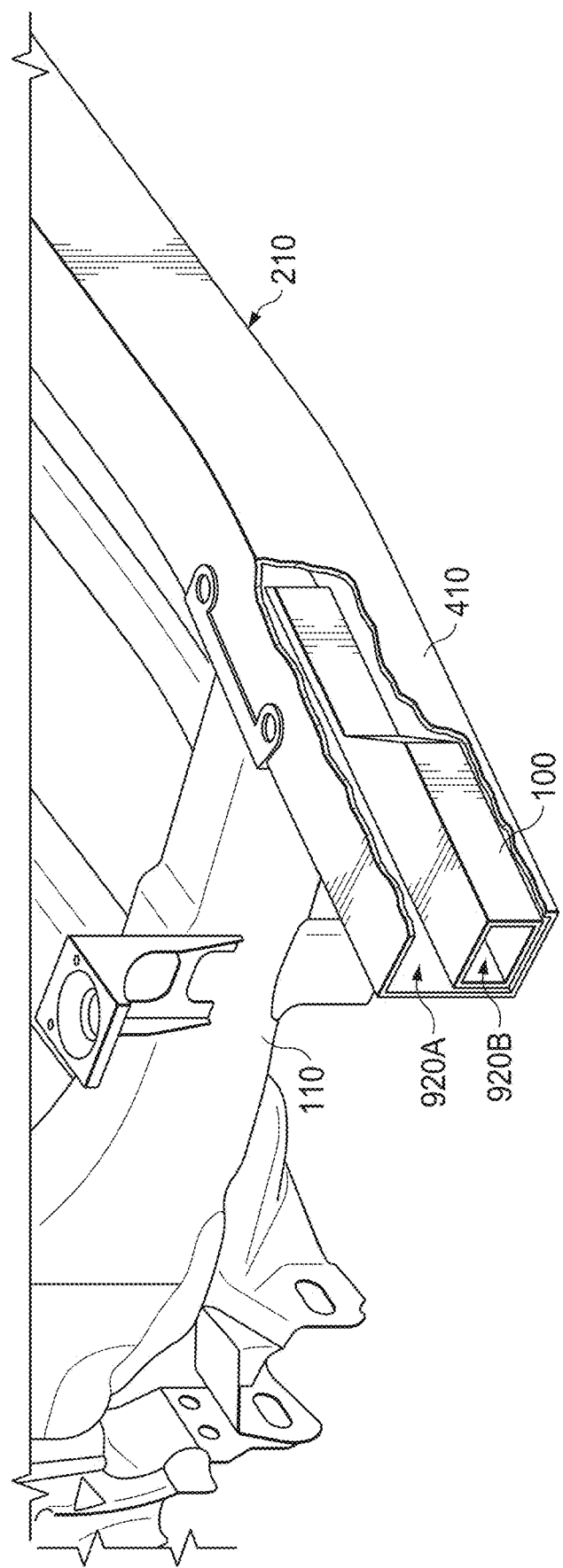
FIG. 12 is a perspective view of an example bumper end insert structure in accordance with at least one embodiment of the present disclosure.

FIG. 12 is a perspective view of an example bumper end insert structure 100 in accordance with at least one embodiment of the present disclosure. The bumper end insert 100 of the present disclosure fits within the end 410 of the aluminum bumper beam 210, and is fixedly attached (e.g., bolted, welded) to both the bumper beam 210 and the right-hand frame rail 110. In this example, although the bumper beam 210 includes two compartments 920A and 920B, only the lower compartment 920B includes a bumper end insert 100. In other embodiments, bumper end inserts 100 may be incorporated into the upper compartment 920A instead of, or in addition to, the lower compartment 920B, or may be incorporated into multiple compartments. In such embodiments, the bumper end inserts 100 may be identical to one another, or may be sized or shaped differently in order to accommodate differently sized or shaped compartments within the bumper beam 210.

FIG. 13 is a top view of an example bumper end insert structure 100 in accordance with at least one embodiment of the present disclosure. The bumper end insert 100 of the present disclosure fits within the end 410 of the aluminum bumper beam 210, and is fixedly attached (e.g., bolted, welded) to both the bumper beam 210 and the right-hand frame rail 110.

FIG. 14 is a top view of an example bumper beam 210 in accordance with at least one embodiment of the present disclosure. In this example, the bumper beam 210 is fixedly attached (e.g., bolted, welded, etc.) to the right and left frame rails 110 and 120, which are fixedly attached to the No. 1 cross member 130. Also visible is a section line 15A-15A that passes through a portion of the left unsupported end 410B of the bumper beam 210, and a section line 15B-15B that passes through both a portion of the bumper beam 210 and the left-hand frame rail 120. Each of the frame rails 110 and 120 includes a crush box 1410 whose size, shape, and composition permit it to absorb crash energy by crushing along a longitudinal axis 1140.

FIG. 15A is a side cross-sectional view along a plane defined by line 15B-15B of FIG. 14, of an example bumper end insert structure 100 in accordance with at least one embodiment of the present disclosure. In this example, the bumper beam 210 comprises a single extrusion that includes a central partition 910 defining two compartments, 920A and 920B. The bumper end insert 100 fits into compartment 920B as shown, although in other embodiments a bumper end insert 100 may fit into compartment 920B instead or in addition, or into a single compartment of a single-compartment bumper beam 210, or into multiple compartments of a multi-compartment bumper beam 210. The tab portion 1120 of the bumper end insert 100 (as shown in FIG. 11) is fixedly attached (e.g., bolted, welded, etc.) to both the bumper beam 210 and the left-hand frame rail 120, such that the bumper beam 210 is able to crush along line 15A-15A (as shown in FIG. 14) and, when fully crushed, able to transfer crash energy to the crush box 1410 of the left-hand frame rail 120.

FIG. 15B is a side cross-sectional view along a plane defined by line 15A-15A of FIG. 14, of an example bumper end insert structure 100 in accordance with at least one embodiment of the present disclosure. In this example, the bumper beam 210 comprises a single extrusion that includes a central partition 910 defining two compartments, 920A and 920B. The bumper end insert 100 fits into compartment 920B as shown, although in other embodiments a bumper end insert 100 may fit into compartment 920A instead or in addition, or into a single compartment of a single-compartment bumper beam 210, or into multiple compartments of a multi-compartment bumper beam 210. The body portion 1110 of the bumper end insert 100 (as shown in FIG. 11 and made, for example of steel) is fixedly attached (e.g., bolted, welded, etc.) to both the bumper beam 210 and the left-hand frame rail 120, such that the unsupported end 410B of the bumper beam 210 (as shown for example in FIG. 14) is inhibited from crushing or shearing. This in turn permits crash energy imparted to the unsupported end 410B (e.g., from an SOL barrier 220 as shown for example in FIG. 5) to be transferred to the crush box 1410 of the left-hand frame rail 120 (as shown for example in FIG. 14) rather than to the passenger cabin 240 (as shown for example in FIG. 2).

Figure 16:
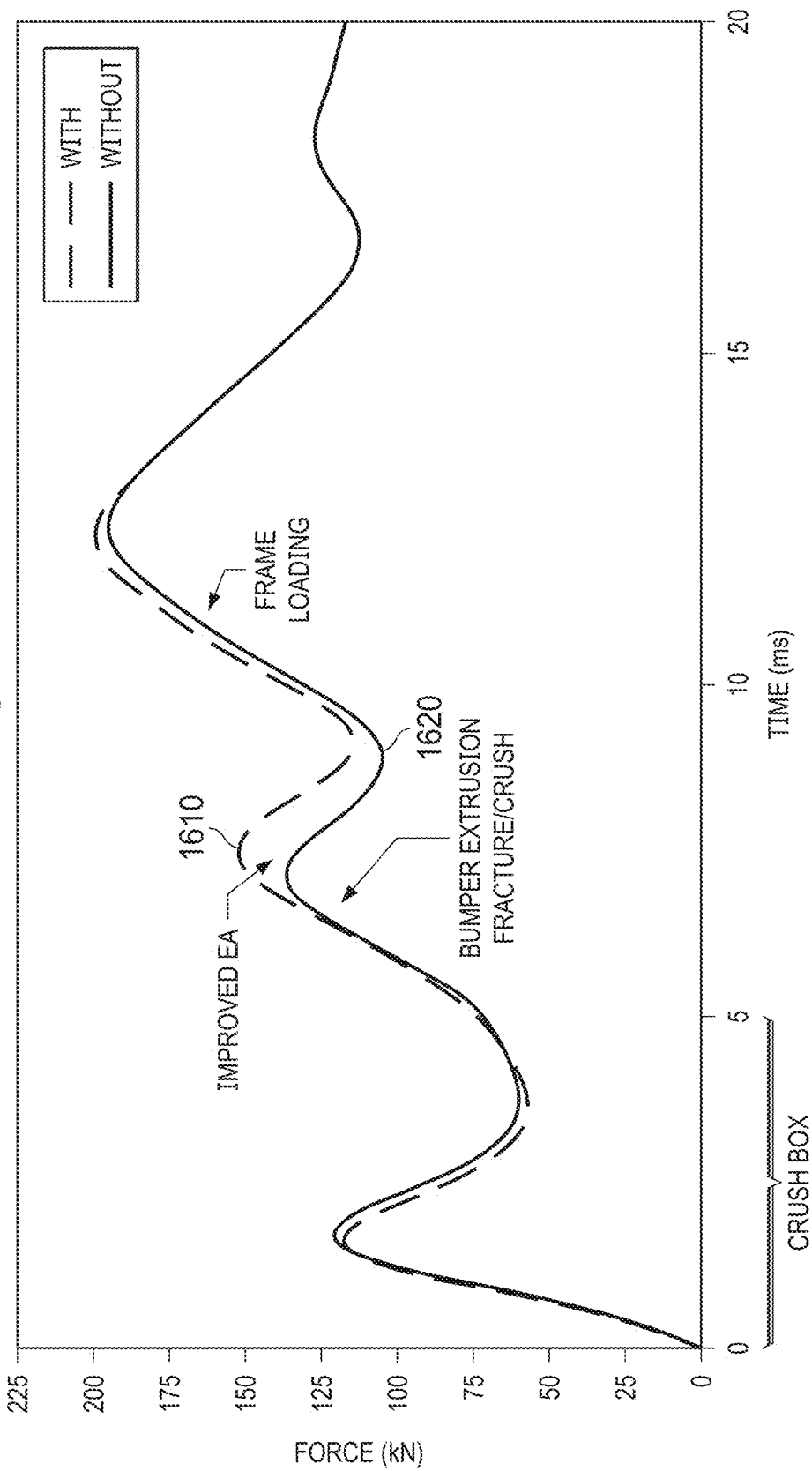
FIG. 16 is a graph showing the longitudinal force experienced by an SOL barrier in an example SOL collision by an example vehicle with and without the novel bumper end insert structure, in accordance with at least one embodiment of the present disclosure.

FIG. 16 is a graph 1600 showing the longitudinal force (e.g., the force along longitudinal axis 1140 as shown for example in FIG. 14) that is experienced by an SOL barrier 220 (as shown for example in FIG. 2) in an example SOL collision by an example vehicle 200 with and without the novel bumper end insert structure 100, as a function of time (measured in milliseconds (ms)) from the beginning of the SOL crash event (e.g., from the moment of first contact between the SOL barrier 220 and the bumper beam 210), in accordance with at least one embodiment of the present disclosure. Curve 1610 represents the force when the bumper beam 210 includes a bumper end insert 100 (hereinafter referred to as the countermeasure case), whereas curve 1620 represents the force when the bumper beam 210 does not include a bumper beam insert 100 (hereinafter referred to as the baseline case).

As shown in the graph 1600, during a first time period from about 0 ms to about 5 ms, the baseline curve 1620 and countermeasure curve 1610 show a similar force loading, as the crush box 1410 of a frame rail 110 or 120 absorbs energy via crushing or crumpling. During a second time period, from about 5 ms to about 10 ms, the baseline curve 1620 shows lower force because an unsupported end 410 of the bumper beam 210 has fractured or sheared off, and is no longer able to absorb or transfer energy crash energy. Conversely, the countermeasure curve 1610 shows higher force exerted by the vehicle 200 on the SOL barrier 220, because the unsupported end 410 of the bumper beam 210 remains intact and attached to the bumper beam 210, and therefore able to dissipate crash energy (e.g., by bending or crushing) or else transfer crash energy to the crush box 1410 of the frame rail 110 or 120, or to assist in crushing of the bumper beam 210 itself. This improved energy absorption (EA) shows as a vertical separation between curve 1610 and curve 1620. During a third time period, from about 10 ms to about 15 ms, the countermeasure case 1610 and baseline case 1620 again show similar force, representing "frame loading", e.g., the transfer of crash energy from the SOL barrier to the vehicle frame 105, which is more rigid than either the bumper beam 210 or the crush box 1410 and therefore generates more stopping force.

In the countermeasure case, the bumper beam 210 breaks later and with less severity, allowing for more complete crushing of the bumper beam and the crush boxes of the left and right frame rails, thus allowing greater overall energy absorption. The area under the countermeasure curve 1610 is greater than the area under the baseline curve 1620, indicating improved overall energy absorption and dissipation during the SOL crash event, as well as improved pushing that can, for example, push the vehicle away from the SOL barrier 220 earlier in the crash, thereby reducing the total transfer of energy between the SOL barrier 220 and the vehicle 200. These factors may, in turn, tend to reduce the likelihood or severity of deformation to the passenger cabin 240, thereby reducing the risk of injury to vehicle occupants.

Accordingly, it can be seen that the bumper end insert structure offers substantial improvement, by improving passenger safety in the challenging frontal crash mode called small overlap rigid barrier (SOL), wherein a vehicle strikes a rigid barrier at ~25% overlap or less to the vehicle width. The bumper end insert structure reduces peak forces and deceleration, and reduces the total deformation to the vehicle cabin.

Depending on the implementation, the bumper end insert structure may be made from a variety of different materials, including but not limited to metals, composites, ceramics, and polymers. Bumper end insert members may be hollow, solid, honeycombed, ribbed, made of foam, or otherwise constructed in such a way as to provide high fracture resistance with low added weight. Attachment may be with screws, rivets, rods, pins, brackets, adhesives, or otherwise, and may be to only the bumper beam, to only the frame rail, to both the bumper beam and the frame rail, or to other portions of the frame. Further, a number of variations are possible on the examples and embodiments described above. For example, the components could be longer, shorter, wider, thicker or of different cross-sectional shape than depicted herein (e.g., U-shaped, I-shaped, E-shaped, Z-shaped, rectangular, trapezoidal, etc.), and may be oriented or angled in alternative manners that serve the same purpose of permitting the front bumper beam to absorb, transfer, and dissipate a greater amount of SOL impact energy without fracturing. The technology described herein may be employed in automobiles and trucks of diverse type and design, regardless of their underlying propulsion technologies.

Accordingly, the logical operations making up the embodiments of the technology described herein are referred to variously as operations, steps, objects, elements, components, or modules. Furthermore, it should be understood that these may occur in any order, unless explicitly claimed otherwise or a specific order is inherently necessitated by the claim language.

In some implementations, the components are bolted together to reduce cost. In other embodiments, multiple parts are welded together or co-formed as single parts. It should further be understood that the described technology may be employed in other vehicle types, whether motorized or not, including but not limited to vans, minivans, SUVs, crossover vehicles, RVs, trailers, mobile homes, and food trucks.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the bumper end insert structure. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the bumper end insert structure as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A device comprising:
    a member insertable into an end of a bumper beam of a vehicle,
    wherein a first portion of the inserted member occupies an unsupported end of the bumper beam,
    wherein a second portion of the inserted member is fixedly attached to the bumper beam and to a left frame rail or a right frame rail of the vehicle,
    wherein a third portion of the inserted member occupies a portion of the bumper beam between the left frame rail and the right frame rail, and
    wherein the first portion, second portion, and third portion each have a U-shaped cross section,
    wherein an open portion of the U-shaped cross section faces away from the fixed attachment.

2. The device of claim 1, wherein the second portion has a greater length along a longitudinal axis of the vehicle than the first portion and third portion.

3. The device of claim 1, wherein the first portion, second portion, and third portion are configured to prevent the unsupported end of the bumper beam from shearing off when deformed by a collision.

4. The device of claim 1, wherein the member comprises steel.

5. The device of claim 1, including the bumper beam.

6. The device of claim 1, including the vehicle.

7. The device of claim 1, wherein the first portion extends across an interior width of the bumper beam along a longitudinal axis of the vehicle, and wherein the second portion and third portion extend for less than the interior width of the bumper beam along the longitudinal axis of the vehicle.

8. The device of claim 7, wherein the second portion is configured to bend when the unsupported end of the bumper beam is deformed by a collision.

9. The device of claim 7, wherein the second and third portions are configured to permit the bumper beam to crush along the longitudinal axis of the vehicle, when the bumper beam is deformed by a collision.

10. A device comprising:
    a member insertable into an end of a bumper beam of a vehicle,
    wherein a first portion of the inserted member occupies an unsupported end of the bumper beam,
    wherein a second portion of the inserted member is fixedly attached to the bumper beam and to a left frame rail or a right frame rail of the vehicle,
    wherein a third portion of the inserted member occupies a portion of the bumper beam between the left frame rail and the right frame rail, and
    wherein the first portion has a rectangular cross section, and wherein the second portion and third portion each have a U-shaped cross section.

11. The device of claim 10, wherein the first portion extends across an interior width of the bumper beam along a longitudinal axis of the vehicle, and wherein the second portion and third portion extend for less than the interior width of the bumper beam along the longitudinal axis of the vehicle.

12. The device of claim 11, wherein the second portion is configured to bend when the unsupported end of the bumper beam is deformed by a collision.

13. The device of claim 11, wherein the second and third portions are configured to permit the bumper beam to crush along the longitudinal axis of the vehicle, when the bumper beam is deformed by a collision.

14. The device of claim 10, wherein the second portion has a greater length along a longitudinal axis of the vehicle than the first portion and third portion.

15. The device of claim 10, wherein the first portion, second portion, and third portion are configured to prevent the unsupported end of the bumper beam from shearing off when deformed by a collision.

16. The device of claim 10, wherein the member comprises steel.

17. The device of claim 10, including the bumper beam.

18. The device of claim 10, including the vehicle.

19. A method comprising:
    inserting a member into an end of a bumper beam of a vehicle, wherein a first portion of the inserted member occupies an unsupported end of the bumper beam,
wherein a second portion of the inserted member is fixedly attached to the bumper beam and to a left frame rail or right frame rail of the vehicle,
wherein a third portion of the inserted member occupies a portion of the bumper beam between the left frame rail and right frame rail,
wherein the first portion, second portion, and third portion each have a U-shaped cross section,
wherein an open portion of the U-shaped cross section faces away from the fixed attachment.

20. The method of claim 19, wherein the first portion, second portion, and third portion are configured to prevent the unsupported end of the bumper beam from shearing off when deformed by a collision.

21. The method of claim 19, wherein the member comprises steel.

22. The method of claim 19, wherein the second portion is configured to bend when the unsupported end of the bumper beam is deformed by a collision, and wherein the second and third portions are configured to permit the bumper beam to crush along a longitudinal axis of the vehicle, when the bumper beam is deformed by the collision.

23. A method comprising:
inserting a member into an end of a bumper beam of a vehicle,
wherein a first portion of the inserted member occupies an unsupported end of the bumper beam,
wherein a second portion of the inserted member is fixedly attached to the bumper beam and to a left frame rail or right frame rail of the vehicle,
wherein a third portion of the inserted member occupies a portion of the bumper beam between the left frame rail and right frame rail, and
wherein the first portion has a rectangular cross section extending across an interior width of the bumper beam along a longitudinal axis of the vehicle, and wherein the second portion and third portion each have a U-shaped cross section extending for less than the interior width of the bumper beam along the longitudinal axis of the vehicle.

24. The method of claim 23, wherein the second portion is configured to bend when the unsupported end of the bumper beam is deformed by a collision, and wherein the second and third portions are configured to permit the bumper beam to crush along the longitudinal axis of the vehicle, when the bumper beam is deformed by the collision.

25. The method of claim 23, wherein the first portion, second portion, and third portion are configured to prevent the unsupported end of the bumper beam from shearing off when deformed by a collision.

26. The method of claim 23, wherein the member comprises steel.

27. A system for distributing crash energy within a vehicle, comprising:
the vehicle;
a left frame rail positioned on a left side of the vehicle;
a right frame rail positioned on a right side of the vehicle;
a bumper beam extending laterally between the left frame rail and the right frame rail, and having a left unsupported end extending beyond the left frame rail and a right unsupported end extending beyond the right frame rail;
a first steel member having:
a first section positioned within the left unsupported end of the bumper beam;
a second section positioned within the bumper beam and fixedly attached to the bumper beam and the left frame rail; and
a third section positioned within the bumper beam and extending partway between the left frame rail and the right frame rail
wherein the first section, second section, and third section each have a U-shaped cross section,
wherein an open portion of the U-shaped cross section faces away from the fixed attachment of the first steel member; and
a second steel member having:
a first section positioned within the right unsupported end of the bumper beam;
a second section positioned within the bumper beam and fixedly attached to the bumper beam and the right frame rail; and
a third section positioned within the bumper beam and extending partway between the right frame rail and the left frame rail
wherein the first section, second section, and third section each have a U-shaped cross section,
wherein an open portion of the U-shaped cross section faces away from the fixed attachment of the second steel member.

28. The system of claim 27, wherein the second portion of each steel member is configured to bend when the corresponding unsupported end of the bumper beam is deformed by a collision, and wherein the second and third portions are configured to permit the bumper beam to crush along a longitudinal axis of the vehicle, when the bumper beam is deformed by the collision.

29. A system for distributing crash energy within a vehicle, comprising:
the vehicle;
a left frame rail positioned on a left side of the vehicle;
a right frame rail positioned on a right side of the vehicle;
a bumper beam extending laterally between the left frame rail and the right frame rail, and having a left unsupported end extending beyond the left frame rail and a right unsupported end extending beyond the right frame rail;
a first steel member having:
a first section positioned within the left unsupported end of the bumper beam;
a second section positioned within the bumper beam and fixedly attached to the bumper beam and the left frame rail; and
a third section positioned within the bumper beam and extending partway between the left frame rail and the right frame rail; and
a second steel member having:
a first section positioned within the right unsupported end of the bumper beam;
a second section positioned within the bumper beam and fixedly attached to the bumper beam and the right frame rail; and
a third section positioned within the bumper beam and extending partway between the right frame rail and the left frame rail,
wherein the first section of each steel member has a rectangular cross section extending across an interior width of the bumper beam along a longitudinal axis of the vehicle, and wherein the second section and third section of each steel member each have a U-shaped cross section extending for less than the interior width of the bumper beam along the longitudinal axis of the vehicle.

30. The system of claim 29, wherein the second section of each steel member is configured to bend when the corresponding unsupported end of the bumper beam is deformed by a collision, and wherein the second and third sections are configured to permit the bumper beam to crush along the longitudinal axis of the vehicle, when the bumper beam is deformed by the collision.

* * * * *